United States Patent
Zheng et al.

(10) Patent No.: US 7,672,784 B2
(45) Date of Patent: Mar. 2, 2010

(54) USING STATISTICS OF A FITTING FUNCTION FOR DATA-DRIVEN DISPERSION SLOWNESS PROCESSING

(75) Inventors: Yibing Zheng, Houston, TX (US); Xiao Ming Tang, Sugar Land, TX (US); Douglas J. Patterson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 424 days.

(21) Appl. No.: 11/820,839

(22) Filed: Jun. 21, 2007

(65) Prior Publication Data

US 2008/0010021 A1   Jan. 10, 2008

Related U.S. Application Data

(60) Provisional application No. 60/815,545, filed on Jun. 21, 2006, provisional application No. 60/816,765, filed on Jun. 27, 2006.

(51) Int. Cl.
*G01V 1/40* (2006.01)
*G06F 19/00* (2006.01)

(52) U.S. Cl. ............... 702/6; 702/124; 702/179; 702/180; 73/152.02

(58) Field of Classification Search .............. 702/6, 702/66–75, 57–58, 179, 180, 124; 73/152.02
See application file for complete search history.

(56) References Cited

U.S. PATENT DOCUMENTS

| 3,321,625 | A |   | 5/1967 | Wahl ................. 250/71.5 |
| 4,953,399 | A | * | 9/1990 | Fertl et al. ........... 73/152.02 |
| 5,452,761 | A | * | 9/1995 | Beard et al. ............ 324/323 |
| 6,930,616 | B2 |  | 8/2005 | Tang et al. ............ 340/854.4 |

FOREIGN PATENT DOCUMENTS

WO   WO2006078416 A   7/2006

OTHER PUBLICATIONS

Tim W. Geerits et al.; *Centroid phase slowness as a tool for dispersion correction of dipole acoustic logging data*, Geophysics, vol. 68, No. 1 (Jan.-Feb. 2003), pp. 101-107, 8 Figs., 2 Tables.
Xiaojun Huang et al.; *A Data-Driven Approach to Extract Shear and Compressional Slowness From Dispersive Waveform Data*, EG/Houston 2005 Annual Meeting, pp. 384-388.
C. V. Kimball; *Shear slowness measurement by dispersive processing of the borehole flexural mode*, Geophysics, vol. 63, No. 2 (Mar.-Apr. 1998), pp. 337-344, 6 Figs., 2 Tables.

* cited by examiner

*Primary Examiner*—Eliseo Ramos Feliciano
*Assistant Examiner*—Phuong Huynh
(74) *Attorney, Agent, or Firm*—Madan & Sriram, P.C.

(57) ABSTRACT

Dispersive array acoustic data are acquired. A histogram is determined from the semblance-frequency coherence of the data. The low frequency limit of the data is estimated by matching the statistics of the histogram to the statistics of a modeling function.

11 Claims, 9 Drawing Sheets
(2 of 9 Drawing Sheet(s) Filed in Color)

USING STATISTICS OF A FITTING FUNCTION FOR DATA-DRIVEN DISPERSION SLOWNESS PROCESSING

CROSS-REFERENCES TO RELATED APPLICATIONS

This application claims priority from U.S. provisional patent application Ser. No. 60/815545 filed on Jun. 21, 2006, and from U.S. provisional patent application Ser. No. 60/816765 filed on Jun. 27, 2006.

FIELD OF THE INVENTION

The present disclosure is a method of and an apparatus for obtaining estimates of velocities of earth formations that are dispersive, i.e., the velocity is a function of frequency.

BACKGROUND OF THE ART

The search for subsurface hydrocarbon deposits typically involves a multifaceted sequence of data acquisition, analysis, and interpretation procedures. The data acquisition phase involves use of an energy source to generate signals that propagate into the earth and reflect from various subsurface geologic structures. The reflected signals are recorded by a multitude of receivers on or near the surface of the earth, or in an overlying body of water. The received signals, which are often referred to as seismic traces, consist of amplitudes of acoustic energy that vary as a function of time, receiver position, and source position and, most importantly, vary as a function of the physical properties of the structures from which the signals reflect. The data analyst uses these traces along with a geophysical model to develop an image of the subsurface geologic structures. An important aspect of the geophysical modeling is the availability of estimates of the velocity of propagation in the earth formation.

Wireline measurements are commonly made in a borehole for measurement of the velocities of seismic waves in earth formation. Many of these seismic wave-types are dispersive in nature, i.e., they have a velocity that is dependent upon frequency. The dispersive waves may include compressional waves, shear waves and Stoneley waves and may be generated by monopole, dipole or quadrupole sources. FIGS. 2A and 2B illustrate an example of dispersive flexural waves in an earth formation. The curve 201 shows the slowness (ordinate, in µs/ft) as a function of frequency (abscissa, in Hz). FIG. 2B shows simulated waveforms 211 when a medium that has the dispersive characteristics of 201 in FIG. 2A is excited by a source that has the frequency dependence shown by 203. As would be known to those versed in the art, the simulated waveforms depend on both the dispersion curve and the source spectrum. The abscissa in FIG. 2B is time (in ms) and the successive traces are at increasing distances from the source.

The so-called slowness-time coherence (STC) processing has been used for analysis of such dispersive waves. See, for example, Kimball. The STC is commonly defined over a 2-D grid of slowness S, (reciprocal of velocity) and a window starting time T. This 2-D grid is called the slowness-time (ST) plane.

$$\rho(S, T) = \frac{1}{m} \frac{\int_T^{T+T_W} |\sum s_i[t + S(i-1)\delta]|^2 dt}{\sum \int_T^{T+T_W} |s_i[t + S(i-1)\delta]|^2 dt}. \quad (1)$$

In eqn. (1), $\rho$ is the slowness, $s_i$ is the signal, and $\delta$ is the quantization of the slowness grid. FIG. 3 shows an example of the STC plot for the example of FIGS. 2A-2B. The abscissa of FIG. 3 is the arrival time T (in ms) while the ordinate is the slowness in µs/ft. The nature of the STC display of FIG. 3 brings out the problem: how can the formation velocity (in this case, the formation shear velocity) be determined from the STC plot?

The present disclosure addresses the problem of estimation of formation slowness for a dispersive wave propagating in the earth formation.

SUMMARY OF THE DISCLOSURE

One embodiment of the disclosure is a method of evaluating an earth formation. Dispersive array acoustic data are acquired. A slowness-frequency coherence (SFC) of the data is determined. From the SFC, a histogram of the slowness distribution is determined. An analytic function is used to characterize the histogram by matching statistics of the histogram with statistics of the analytic function. The edge of the analytic function defines the cut-off frequency of the dispersive array acoustic data. The array acoustic data may include a compressional wave, a shear wave and/or a Stoneley wave. The acoustic signals giving rise to the data may be generated by a monopole transmitter, a dipole transmitter or a quadrupole transmitter. The statistics used may include the centroid, the peak, a second moment about the centroid, second moment about the peak, skewness about the centroid and skewness about the peak.

Another embodiment of the disclosure is an apparatus for evaluating an earth formation. An acoustic logging tool conveyed in a borehole acquires dispersive array acoustic data. The logging tool includes a transmitter that may be a monopole, a dipole or a quadrupole. Acoustic waves generated by the transmitter are received by an array of receivers on the logging tool. A processor determines a slowness-frequency coherence (SFC) of the data. The processor further determines a histogram of the slowness distribution from the SFC. The processor further uses an analytic function to characterize the histogram by matching statistics of the histogram with statistics of the analytic function. The processor further defines an edge of the analytic function as the cut-off frequency of the dispersive array acoustic data. The array acoustic data may include a compressional wave, a shear wave and/or a Stoneley wave. The acoustic signals giving rise to the data may be generated by a monopole transmitter, a dipole transmitter or a quadrupole transmitter. The statistics used may include the centroid, the peak, a second moment about the centroid, second moment about the peak, a skewness about the centroid and a skewness about the peak.

Another embodiment of the disclosure is a computer-readable medium for use with an apparatus for evaluating an earth formation. The apparatus includes an acoustic logging tool. A transmitter on the logging tool generates dispersive acoustic waves that are recorded by an array of receivers. The medium includes instructions that enable a processor to determine from the array acoustic data a slowness-frequency coherence of the data, a histogram of the slowness distribution and match statistics of the histogram with statistics of a matching function. The matching function defines a slowness limit of the dispersive waves.

BRIEF DESCRIPTION OF THE DRAWINGS

The patent or application file contains at least one drawing executed in color. Copies of this patent or patent application publication with color drawing(s) will be provided by the Office upon request and payment of the necessary fee. For detailed understanding of the present disclosure, reference should be made to the following detailed description of the preferred embodiment, taken in conjunction with the accompanying drawing and in which.

DETAILED DESCRIPTION OF THE DISCLOSURE

The present disclosure is discussed with reference to specific logging instruments that may form part of a string of several logging instruments for conducting wireline logging operations. It is to be understood that the choice of the specific instruments discussed herein is not to be construed as a limitation and that the method of the present disclosure may also be used with other logging instruments as well.

Figure 1:
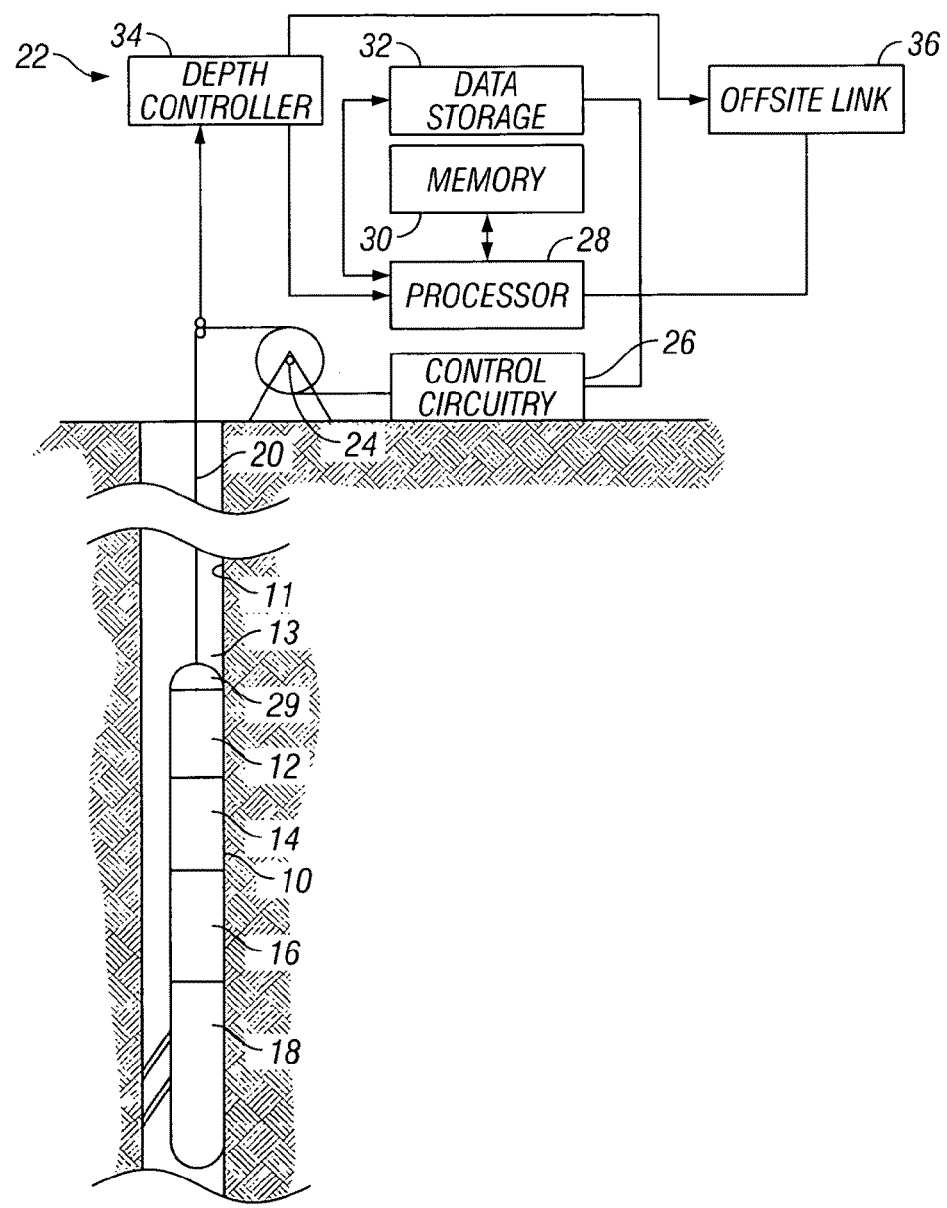
FIG. 1 is a schematic illustration of a wireline logging system.
Figure 2A:
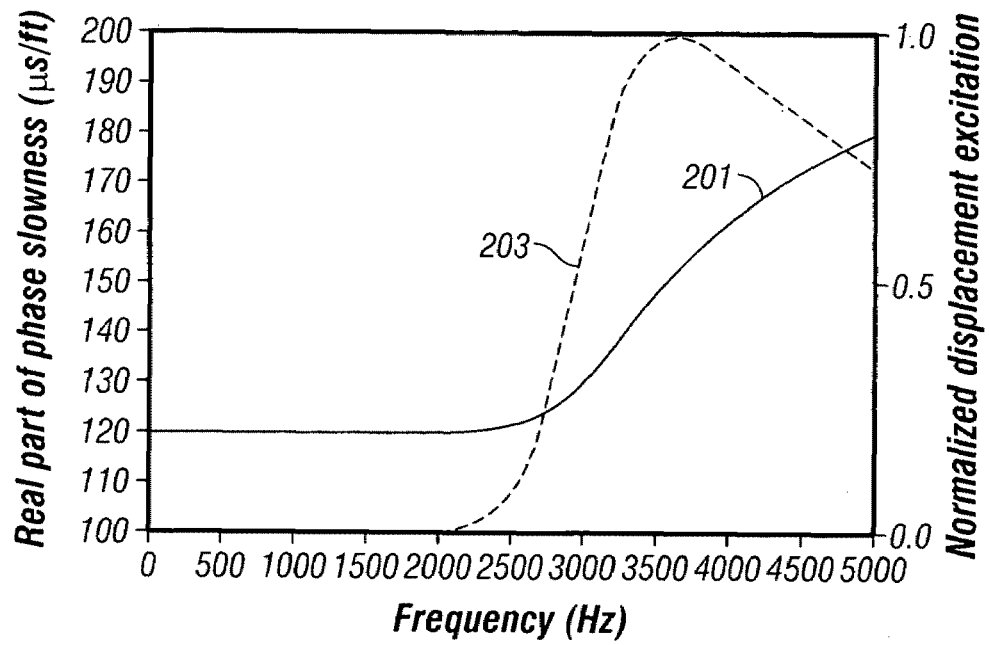
FIGS. 2A and 2B (prior art) illustrate dispersive flexural waves in an earth formation.
Figure 2B:
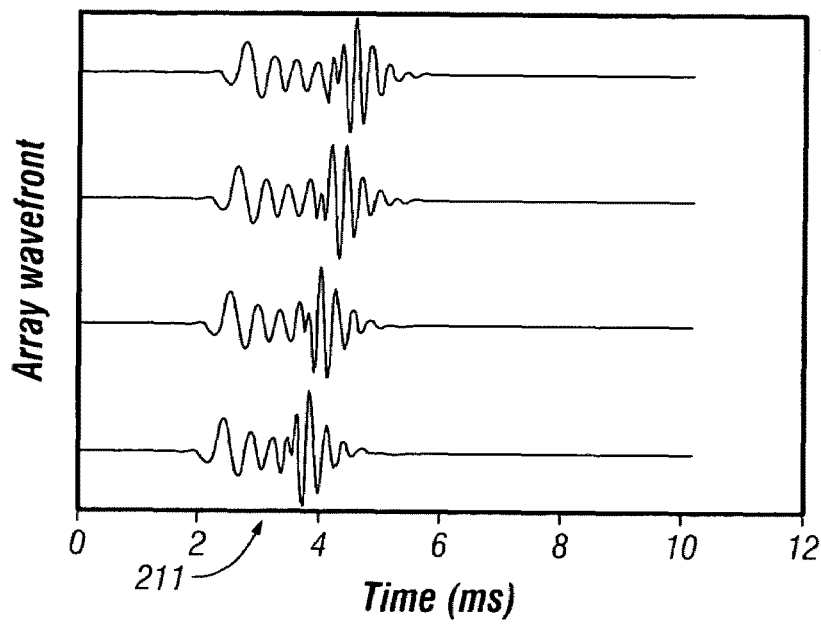
Figure 3:
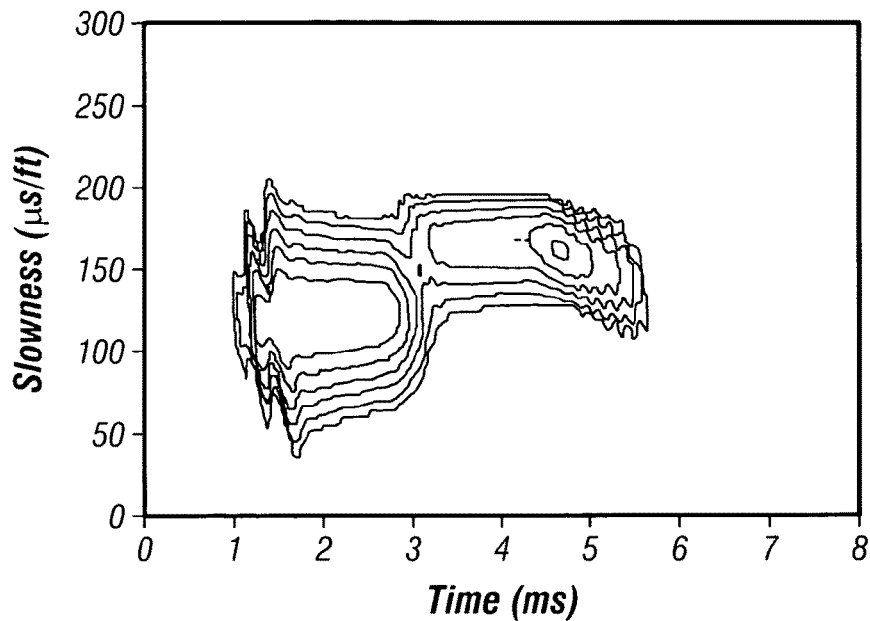
FIG. 3 (prior art) shows a slowness-time coherence plot for an exemplary dispersive wave.

A typical configuration of the logging system is shown in FIG. 1. This is a modification of an arrangement from U.S. Pat. No. 4,953,399 to Fertl et al., having the same assignee as the present disclosure, the contents of which are incorporated herein by reference. Shown in FIG. 1 is a suite of logging instruments 10, disposed within a borehole 11 penetrating an earth formation 13, illustrated in vertical section, and coupled to equipment at the earth's surface, in accordance with various illustrative embodiments of the method and apparatus of the present disclosure. Logging instrument suite 10 may include a resistivity device 12, a natural gamma ray device 14, and/or two porosity-determining devices, such as a neutron device 16 and/or a density device 18. Collectively, these devices and others used in the borehole for logging operations are referred to as formation evaluation sensors. The resistivity device 12 may be one of a number of different types of instruments known to the art for measuring the electrical resistivity of formations surrounding a borehole so long as such device has a relatively deep depth of investigation. For example, a HDIL (High Definition Induction Logging) device such as that described in U.S. Pat. No. 5,452,761 to Beard et al., having the same assignee as the present disclosure, the contents of which are fully incorporated herein by reference, may be used. The natural gamma ray device 14 may be of a type including a scintillation detector including a scintillation crystal cooperatively coupled to a photomultiplier tube such that when the crystal is impinged by gamma rays a succession of electrical pulses is generated, such pulses having a magnitude proportional to the energy of the impinging gamma rays. The neutron device 16 may be one of several types known to the art for using the response characteristics of the formation to neutron radiation to determine formation porosity. Such a device is essentially responsive to the neutron-moderating properties of the formation. The density device 18 may be a conventional gamma-gamma density instrument such as that described in U.S. Pat. No. 3,321,625 to Wahl, used to determine the bulk density of the formation. A downhole processor 29 may be provided at a suitable location as part of the instrument suite.

The logging instrument suite 10 is conveyed within borehole 11 by a cable 20 containing electrical conductors (not illustrated) for communicating electrical signals between the logging instrument suite 10 and the surface electronics, indicated generally at 22, located at the earth's surface. The logging devices 12, 14, 16, and/or 18 within the logging instrument suite 10 are cooperatively coupled such that electrical signals may be communicated between each of the logging devices 12, 14, 16, and/or 18 and the surface electronics 22. The cable 20 is attached to a drum 24 at the earth's surface in a manner familiar to the art. The logging instrument suite 10 is caused to traverse the borehole 11 by spooling the cable 20 on to or off of the drum 24, also in a manner familiar to the art.

The surface electronics 22 may include such electronic circuitry as is necessary to operate the logging devices 12, 14, 16, and/or 18 within the logging instrument suite 10 and to process the data therefrom. Some of the processing may be done downhole. In particular, the processing needed for making decisions on speeding up (discussed below) or slowing down the logging speed is preferably done downhole. If such processing is done downhole, then telemetry of instructions to speed up or slow down the logging could be carried out substantially in real time. This avoids potential delays that could occur if large quantities of data were to be telemetered uphole for the processing needed to make the decisions to alter the logging speed. It should be noted that with sufficiently fast communication rates, it makes no difference where the decision-making is carried out. However, with present data rates available on wirelines, the decision-making is preferably done downhole.

Control circuitry 26 contains such power supplies as are required for operation of the chosen embodiments of logging devices 12, 14, 16, and/or 18 within the logging instrument suite 10 and further contains such electronic circuitry as is necessary to process and normalize the signals from such logging devices 12, 14, 16, and/or 18 in a conventional manner to yield generally continuous records, or logs, of data pertaining to the formations surrounding the borehole 11. These logs may then be electronically stored in a data storage 32 prior to further processing. A surface processor 28 may process the measurements made by the formation evaluation sensor(s) 12, 14, 16, and/or 18. This processing could also be done by the downhole processor 29.

The surface electronics 22 may also include such equipment as will facilitate machine implementation of various illustrative embodiments of the method of the present disclosure. The surface processor 28 may be of various forms, but preferably is an appropriate digital computer programmed to process data from the logging devices 12, 14, 16, and/or 18. A memory unit 30 and the data storage unit 32 are each of a type to interface cooperatively with the surface processor 28 and/or the control circuitry 26. A depth controller 34 determines the longitudinal movement of the logging instrument suite 10 within the borehole 11 and communicates a signal representative of such movement to the surface processor 28. The logging speed is altered in accordance with speedup or slowdown signals that may be communicated from the downhole processor 29, and/or provided by the surface processor 28, as discussed below. This is done by altering the rotation speed of the drum 24. Offsite communication may be provided, for example, by a satellite link, by a telemetry unit 36.

Figure 4:
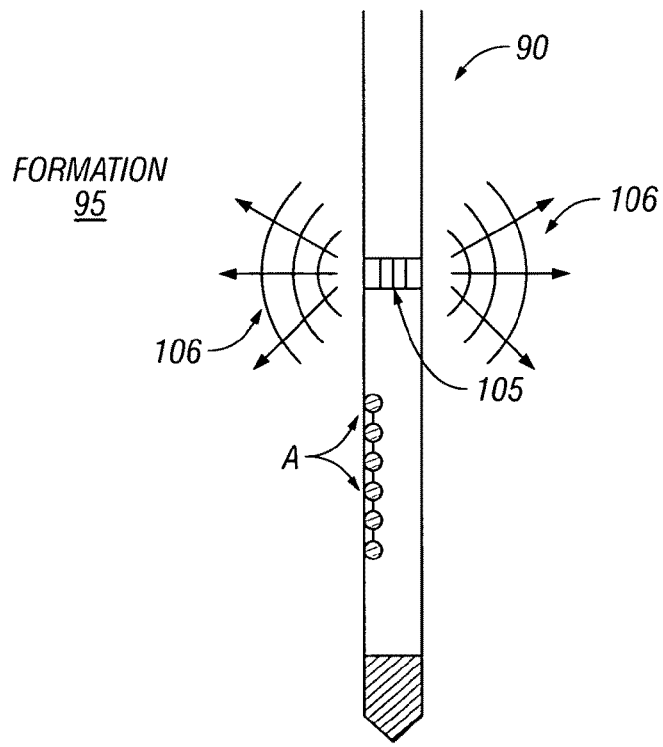
FIG. 4 illustrates a logging tool on a mandrel.

FIG. 4 is a schematic view of an acoustic logging tool on a mandrel 90. The acoustic logging tool has a source 105 to emit acoustic vibrations 106 that may traverse formation 95 and may also be propagated along the borehole wall and be received by sensors A which may be in arrays. For the purposes of this disclosure, all of these vibrations may be considered as defining propagating waves in the earth formation, and the elements of the array provide a plurality of signals indicative of the propagating wave.

Figure 5A:
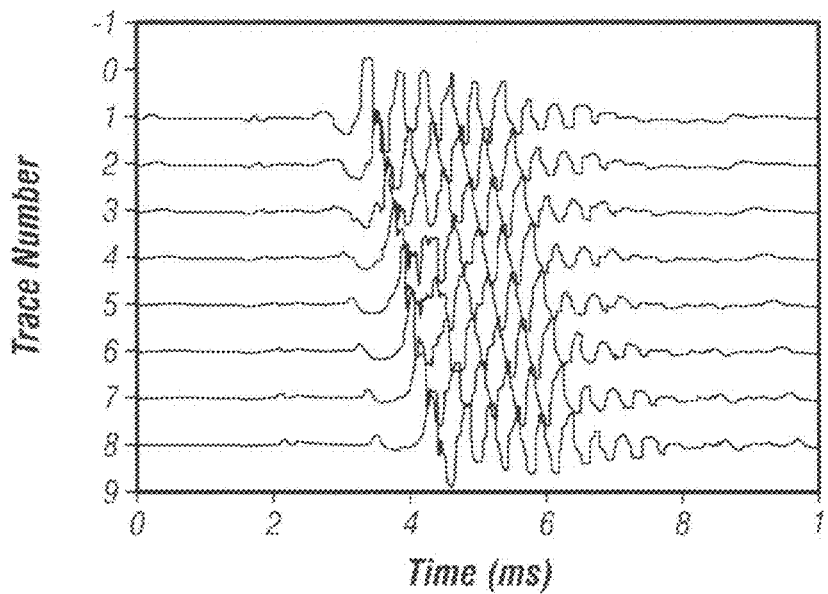
FIG. 5A (prior art) illustrates a suite of dispersive waveforms recorded by a dipole logging tool in a borehole.
Figure 5B:
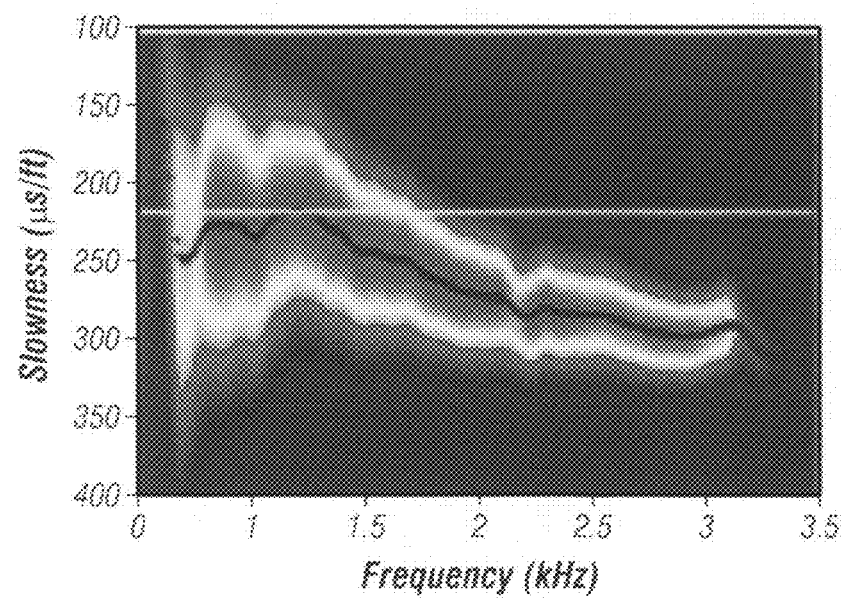
FIG. 5B (prior art) is a slowness-frequency coherence plot corresponding to the data of FIG. 5A.

FIG. 5A shows an example of dispersive data recorded using a dipole source in a borehole. The abscissa is time (in ms). FIG. 5B is a plot of the slowness-frequency coherence (SFC). This is similar to the STC except that the abscissa is the frequency (rather than time). The relation between the time-domain semblance and the frequency domain semblance is given by Geerits and Tang.

The contours of the plot show the SFC determined for the data using the frequency domain version of eqn. (1) disclosed in Geerits and Tang. As shown therein, $$\bar{\rho}(\bar{S}, T_{ar}) = \frac{\int_{-\infty}^{\infty} \bar{\rho}^*[u(\bar{S}, \omega)]|A(\omega)|^2 d\omega}{\int_{-\infty}^{\infty} |A(\omega)|^2 d\omega}, \quad (2)$$

$$\bar{\rho}^*[u(\bar{S}, \omega)] = \frac{1}{m^2}\left[\frac{\sin^2(mu)}{\sin^2(u)}\right], \quad (3)$$

$$u = \frac{\omega[S(\omega, S^*) - \bar{S}]\Delta}{2}. \quad (4)$$

The left-hand side in eqn. (2) represents the time-domain semblance function evaluated at the earliest arrival time (over the array), $T_{ar}$, of the mode of interest, at arbitrary slowness, $\bar{S}$. Eqn. (2) states that the time-domain semblance $\bar{\rho}$ is a spectral weighted average of the frequency domain semblance $\bar{\rho}^*$, weighted by the wave's (first receiver) power spectrum $|A(\omega)|^2$. Apart from the angular frequency, $\omega$, the frequency domain semblance, $\bar{\rho}^*$, is parameterized by the total number of receivers, m[eqn (3)], the inter-receiver spacing, $\Delta$[eqn (3)], and the slowness dispersion function, $S(\omega, S^*)$ [eqn (3)] of the mode of interest. The slowness dispersion function is parameterized by the true formation shear slowness, $S^*$.

Figure 6:
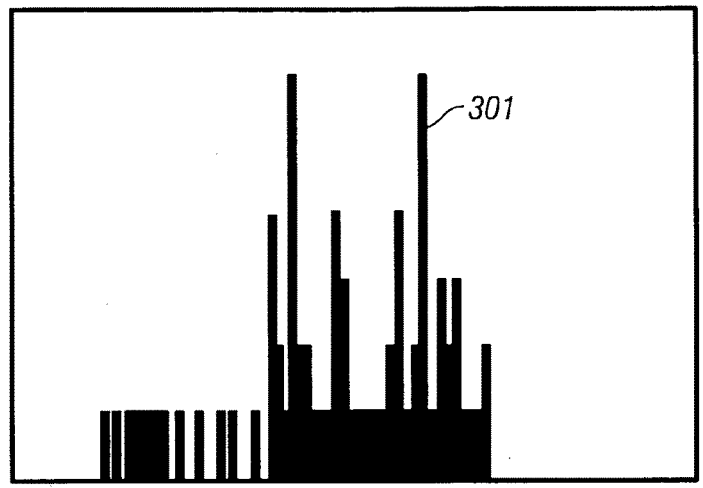
FIG. 6 (prior art) is an exemplary histogram plot of the data of FIG. 5A.

Huang et al. describe a method in which the SFC plot of FIG. 5B is used to produce a histogram 301 such as that shown in FIG. 6. The abscissa is the slowness and the ordinate is the number of samples in the SFC that have a peak of the coherence at a particular slowness.

Figure 7:
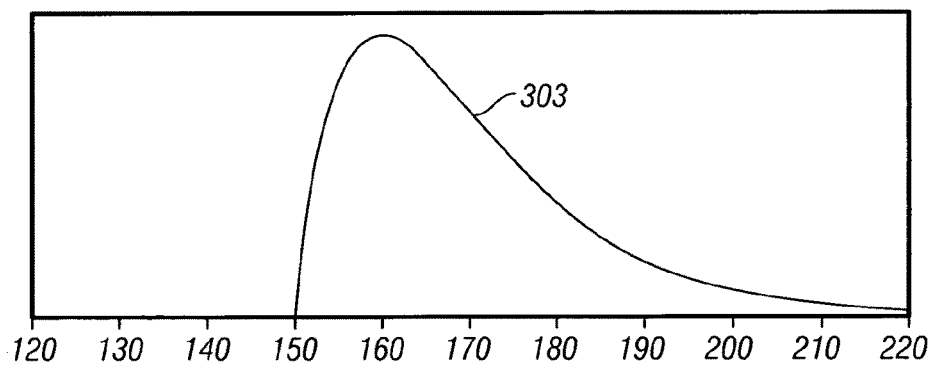
FIG. 7 is a plot of a function used in the present disclosure for fitting histograms of dispersive data.

The formation slowness is located at the edge of the histogram at small slowness values. In one embodiment of the present disclosure, a quick edge detection method for data driven dispersive slowness is developed. The method is based on matching the statistics of a fitting function to the statistics of a slowness histogram. The fitting function is chosen to be:

$$f(s) = A\, s^\beta e^{-\alpha s},\ s = S - S_0,\ S \geq S_0, \quad (5)$$

where S is the slowness. An example of a fitting function is shown by 303 in FIG. 7. Various statistical measures can be fitted.

Many statistics of a statistical distribution of data are known. These include:

1. The centroid $$S_c = \frac{\int_{S_0}^{\infty} Sf(s)dS}{\int_{S_0}^{\infty} f(S)dS}, \quad (6)$$

which upon substituting from eqn. (5) gives $$S_c = \frac{\beta+1}{\alpha} + S_0; \quad (7)$$

2. Peak location $$S_p = \frac{\beta}{\alpha} + S_0; \quad (8)$$

3. Second moment about $S_c$ $$\sigma_c^2 = \frac{\int_{S_0}^{\infty}(S-S_c)^2 f(S)dS}{\int_{S_0}^{\infty} f(S)dS} = \frac{\beta+1}{\alpha^2}, \quad (9)$$

4. Second moment about $S_p$ $$\sigma_p^2 = \frac{\int_{S_0}^{\infty}(S-S_p)^2 f(S)dS}{\int_{S_0}^{\infty} f(S)dS} = \frac{\beta+2}{\alpha^2} \quad (10)$$

5. Function skewness about $S_c$ $$SK_c = \frac{\int_{S_0}^{\infty}(S-S_c)^3 f(S)dS}{\int_{S_0}^{\infty} f(S)dS} = \frac{2(\beta+1)}{\alpha^3}, \quad (11)$$

6. Function skewness about $S_p$ $$SK_p = \frac{\int_{S_0}^{\infty}(S-S_p)^3 f(S)dS}{\int_{S_0}^{\infty} f(S)dS} = \frac{5\beta+6}{\alpha^3}. \quad (12)$$

The front edge of the function given by eqn. (5) at small slowness is the location of the maximum of the first derivative of the function. Therefore, the edge location $S_e$ is $$S_e = \frac{\beta - \sqrt{\beta}}{\alpha} + S_0.$$

When $S_e$ is smaller than $S_0$, the edge is assigned to $S_0$. To solve the edge problem, we only need to know one value of either $S_c$ or $S_p$, and other two values chosen from the six statistical values. Therefore, there are many methods to calculate the edge. A practical implementation of the edge detection method to real data is as follows. The fitting function in equation (5) is a four-parameter function, where the parameters $\alpha$, $\beta$, $S_0$, and A. Three of the parameters can be determined using statistical measures of the histogram computed from the measurement data.

$$\begin{cases} I_0 = \int_{S_0}^{\infty} h(s)dS = \frac{A\Gamma(\beta+1)}{\alpha^{\beta+1}}, & \text{(mean)} \\ S_c = \frac{\int_{S_0}^{\infty} S \cdot h(s)dS}{\int_{S_0}^{\infty} h(s)dS} = \frac{\beta+1}{\alpha} + S_0, & \text{(centroid)} \\ \sigma_c^2 = \frac{\int_{S_0}^{\infty} (S - S_c)^2 \cdot h(s)dS}{\int_{S_0}^{\infty} h(s)dS} = \frac{\beta+1}{\alpha^2}, & \text{(variance)} \end{cases} \quad (13)$$

where $h(s)$ is the measured histogram as a function of slowness. The above three equations result from equating the mean, centroid, and variation of the fitting function to their respective counterpart computed from the measurement histogram. The three equations suffice to determine the parameters $\alpha$, $\beta$, and A. The fourth, and the most important, parameter $S_0$, which defines the edge of the histogram, is found by directly fitting the theoretical histogram to the measured histogram. This fitting can be performed by minimizing the least-squares misfit error between the two histograms, as $$\min \int [f(s;S_0) - h(s)]^2 ds$$

Note the other three parameters of the fitting function are already determined from equations (13). The value of $S_0$ that minimizes the above expression determines the edge of the edge of the measured histogram. This scenario is demonstrated in FIG. 10.

Besides the above described method, other methods can also be used. For example, from the histogram of the measured data, the statistic values can be calculated by their definitions. Substituting them to the value of the fitting function, we can compute $\alpha$, $\beta$ and $S_0$, and then calculate the edge location $S_e$. Here we list five edge calculation methods from a total of 16 methods with different combinations of the statistic values.

1. $S_c$, $S_p$ and $\sigma_c^2$ are known:

$$\alpha = \frac{1}{S_c - S_p},$$

$$\beta = \frac{\sigma_c^2}{(S_c - S_p)^2} - 1,$$

$$S_0 = S_c - \frac{\sigma_c^2}{S_c - S_p}.$$

2. $S_c$, $S_p$ and $\sigma_p^2$ are known:

$$\alpha = \frac{1}{S_c - S_p},$$

$$\beta = \frac{\sigma_p^2}{(S_c - S_p)^2} - 2,$$

$$S_0 = 2S_c - S_p - \frac{\sigma_p^2}{S_c - S_p}.$$

3. $S_c$, $\sigma_c^2$ and $\sigma_p^2$ are known:

$$\alpha = \frac{1}{\sqrt{\sigma_p^2 - \sigma_c^2}},$$

$$\beta = \frac{\sigma_c^2}{\sigma_p^2 - \sigma_c^2} - 1,$$

$$S_0 = S_c - \frac{\sigma_c^2}{\sqrt{\sigma_p^2 - \sigma_c^2}}.$$

4. $S_p$, $\sigma_c^2$ and $\sigma_p^2$ are known:

$$\alpha = \frac{1}{\sqrt{\sigma_p^2 - \sigma_c^2}},$$

$$\beta = \frac{\sigma_c^2}{\sqrt{\sigma_p^2 - \sigma_c^2}} - 1,$$

$$S_0 = S_p - \frac{\sigma_c^2}{\sqrt{\sigma_p^2 - \sigma_c^2}} + \sqrt{\sigma_p^2 - \sigma_c^2}.$$

5. $S_c$, $\sigma_c^2$ and $SK_c$ are known:

$$\alpha = \frac{2\sigma_c^2}{SK_c},$$

$$\beta = \frac{4(\sigma_c^2)^3}{SK_c^2} - 1,$$

$$S_0 = S_c - \frac{2(\sigma_c^2)^2}{SK_c}.$$

The edge location $S_e$ can be calculated using the equation $$S_e = \frac{\beta - \sqrt{\beta}}{\alpha} + S_0.$$

The edge location corresponds to the corrected slowness of the shear or compressional waves.

Figure 8:
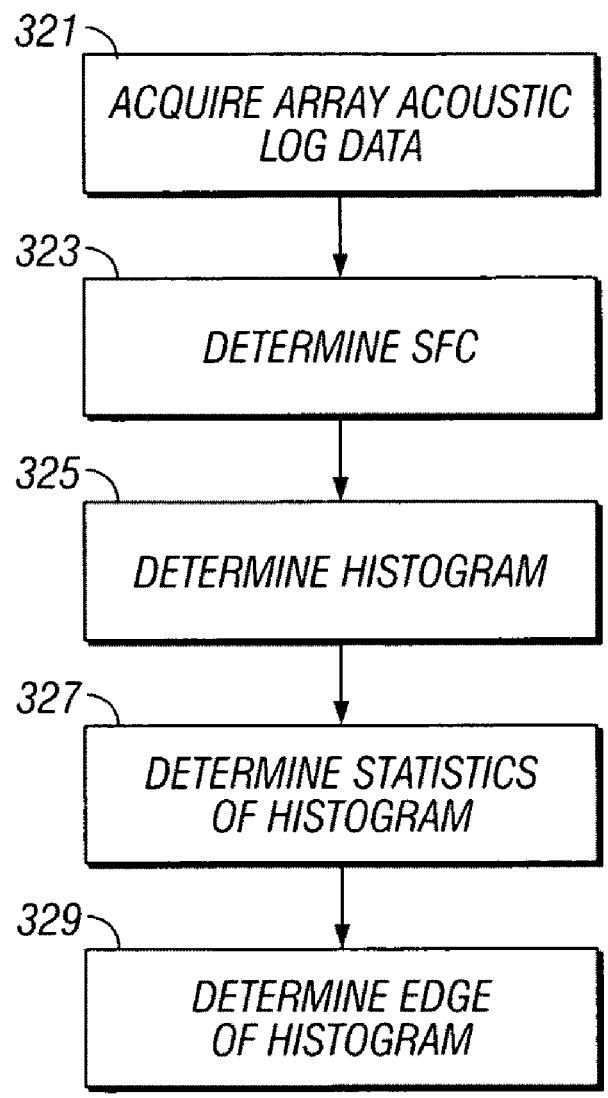
FIG. 8 is a flow chart illustrating one embodiment of the present disclosure.

Turning now to FIG. 8, a flow chart of some of the steps of the method of the present disclosure is shown. Array acoustic log data are acquired 321. A semblance-frequency coherence is determined 323 using, for example, the frequency domain version of eqn. (1). It should be noted that the particular form of the semblance used is for exemplary purposes only and other semblances may be used. From the SFC plot, a histogram plot of frequencies is obtained 325 such as that shown in FIG. 6. From the histogram, various statistical measures of the histogram are obtained 327. As noted above, knowledge of the centroid and peak plus two additional statistical measurements is sufficient for the distribution selected in eqn. (2). Other distributions may be used and may require more or fewer measurements of statistical parameters. For non-gaussian distributions, a minimum of four parameters is believed to be necessary. From the statistical measures of the histogram, the edge of the histogram is determined 329.

Figure 9:
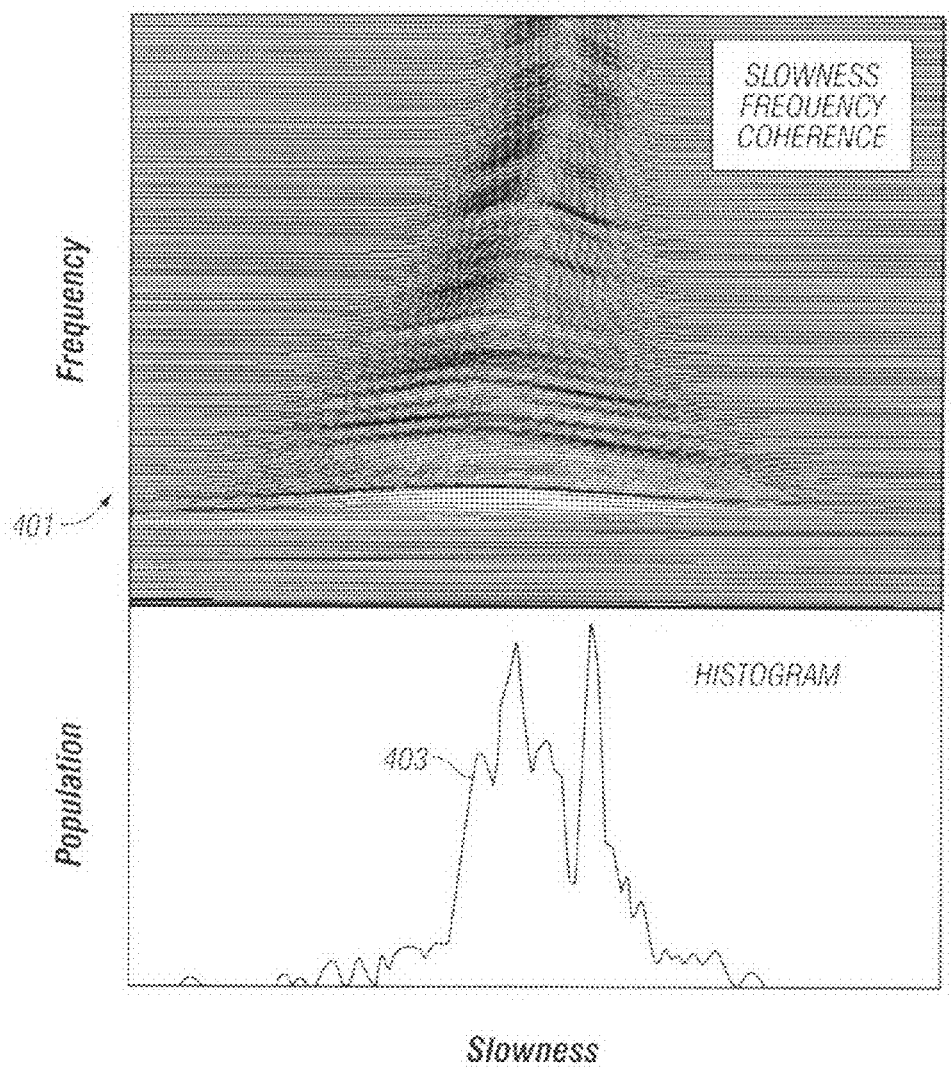
FIG. 9 shows an example of dispersive data along with its histogram.

Turning now to FIG. 9, the top portion shows a slowness-coherency histogram of exemplary dispersive data recorded in a borehole. The lower portion shows a slowness histogram 403 in which, at each frequency, the slowness corresponding to the maximum coherence is registered as an "event" with a single count.

Figure 10:
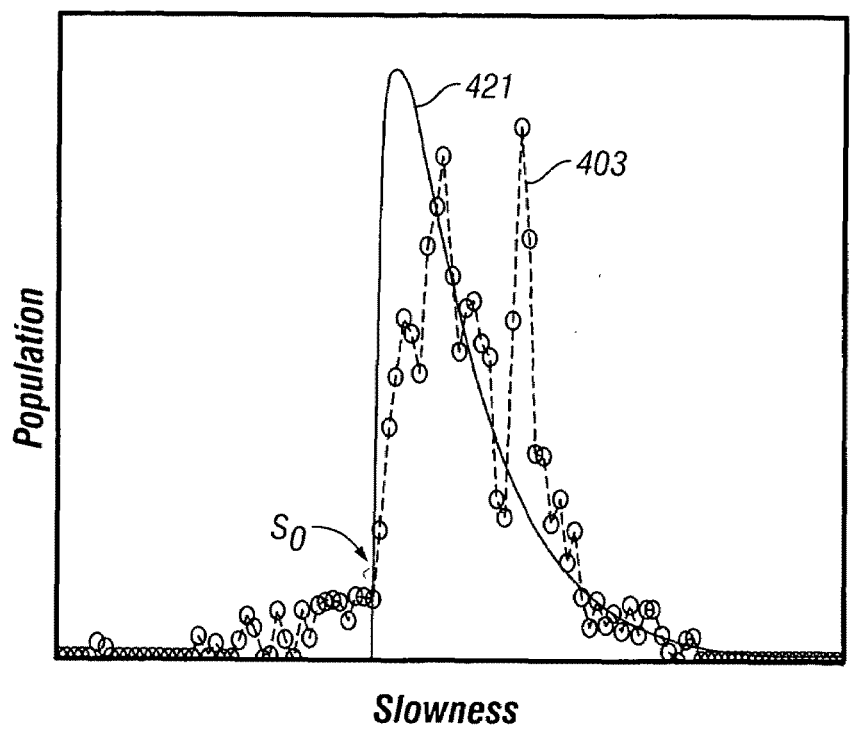
FIG. 10 illustrates the principle of curve-fitting to match the histogram.

FIG. 10 shows the slowness histogram 403 with a fitting function 421. As discussed above, eqn. (5) is used as a fitting function. The edge is detected by determining statistical parameters of the measured histogram with those of the fitting function and subsequently matching the function with the histogram.

Figure 11:
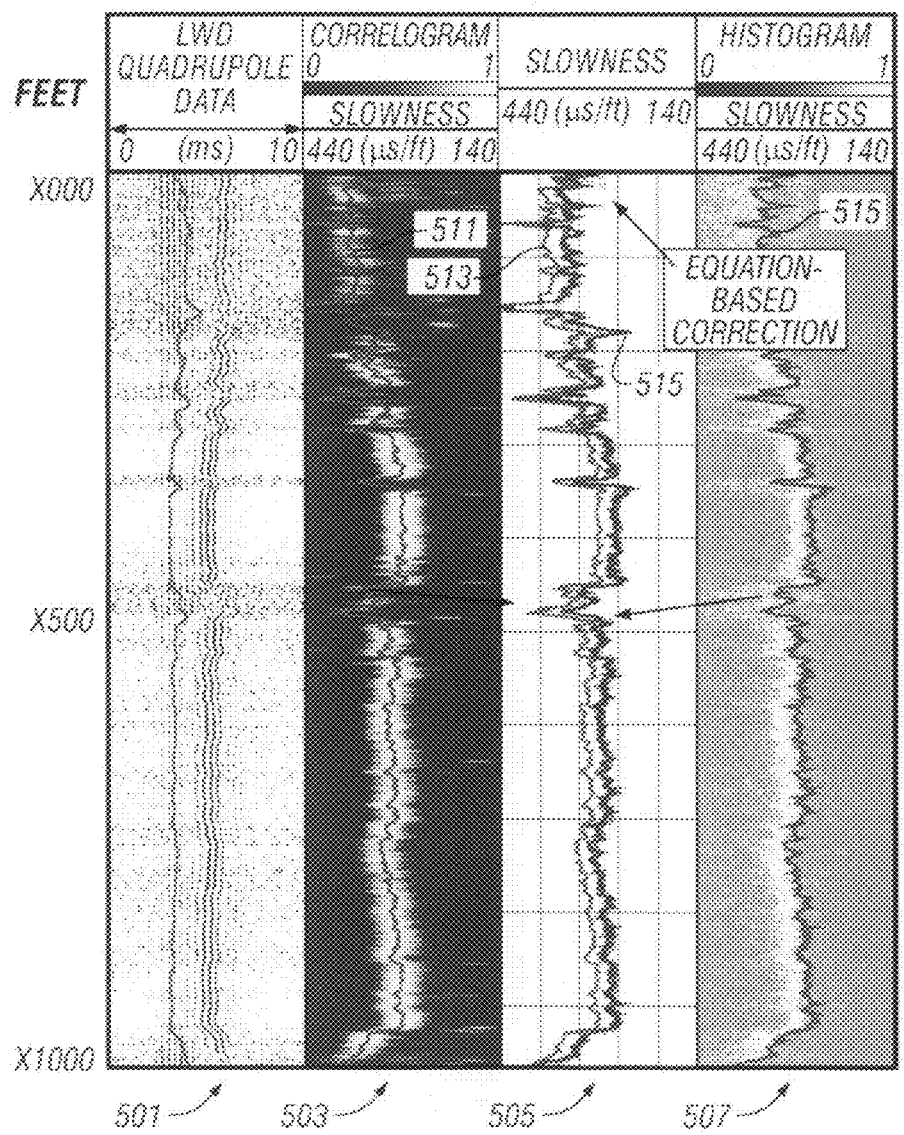
FIG. 11 shows an example of quadrupole data and comparison of results obtained using the method of the present disclosure with a prior art method.

Turning now to FIG. 11, track 1 501 shows exemplary time signals of LWD quadrupole shear-wave data as a function of depth. Note that the horizontal axis has a range of 10 ms. Track 2 503 shows a conventional correlogram as a function of slowness at different depths. The peak of the correlogram 511 is plotted in track 3 505 as the curve 513. The curve 515 has the same values as the curve 517 in track 4 507 and is a plot of estimated slowness as a function of depth using the method of the present disclosure, i.e., the curve 517 is the result of applying the edge detection method to the histograms in track 4 507. As can be seen, the curve 513 has consistently larger values of slowness (i.e., lower velocity) than curve 515.

By way of comparison, also plotted in track 3 505 are data points that were obtained using the method described in U.S. Pat. No. 6,930,616 of Tang et al., having the same assignee as the present application and the contents of which are incorporated herein by reference. Tang teaches the processing of dispersive quadrupole wave data. A slowness of the array quadrupole wave data is obtained. Using a measured slowness of the array quadrupole wave data and other known parameters of the logging tool, borehole and borehole fluid, the slowness is estimated and compared to the actual measured slowness. The formation shear velocity (slowness) is altered until a match is obtained. The diameter of the borehole may be obtained using a suitable caliper device. The match between the model-based method of Tang and the method of the present disclosure is excellent.

Those versed in the art would be familiar with the use of shear wave velocity information in lithologic interpretation, fracture detection, identification of formation fluids, and other uses too numerous to list.

The present disclosure has been described above in terms of a wireline implementation. The method of the present disclosure may also be used in a measurement-while-drilling (MWD) implementation.

The processing of the measurements made in wireline applications may be done by the surface processor 28, by the downhole processor 29, or at a remote location. The data acquisition may be controlled at least in part by the downhole electronics. Implicit in the control and processing of the data is the use of a computer program on a suitable machine-readable medium that enables a processor to perform the control and processing. The machine-readable medium may include ROMs, EPROMs, EEPROMs, flash memories and optical disks. The term processor is intended to include devices such as a field programmable gate array (FPGA).

While the foregoing disclosure is directed to specific embodiments of the present disclosure, various modifications will be apparent to those skilled in the art. It is intended that all variations within the scope of the appended claims be embraced by the foregoing disclosure.

What is claimed is:

1. A method of estimating a slowness of a propagating wave in an earth formation; the method comprising:
   using a logging tool in a borehole to generate the propagating wave and acquire a plurality of signals indicative of the propagating wave;
   determining a slowness frequency coherence of the plurality of signals;
   determining a histogram of a slowness distribution from the slowness frequency coherence, wherein determining the histogram further comprises identifying peaks in a slowness-frequency coherence plot;
   estimating an edge of the histogram by matching statistics of a fitting function to statistics of the histogram, wherein matching the statistics further comprises using at least one of: (i) a centroid, (ii) a peak location, (iii) a second moment about a centroid, (iv) a second moment about the peak, (v) a skewness about a centroid, and (vi) a skewness about a peak;
   using the estimated edge of the histogram to estimate the slowness of the propagating wave; and
   recording the estimated slowness on a suitable medium.

2. The method of claim 1 wherein the propagating wave is selected from the group consisting of: (i) a compressional wave, (ii) a shear wave, and (iii) a Stoneley wave.

3. The method of claim 1 wherein generating the wave further comprises using one of: (i) a monopole transmitter, (ii) a dipole transmitter, and (iii) a quadrupole transmitter.

4. That method of claim 1 further comprising using a fitting function of the form:

$$f(s) = A\, s^\beta e^{-\alpha s},\ s = S - S_0,\ S \geq S_0;$$

where S is the slowness, A, $\alpha$ and $\beta$ are fitting parameters.

5. An apparatus configured to estimate a slowness of a propagating wave in an earth formation; the apparatus comprising:
   a logging tool configured to be conveyed in a borehole, generate the propagating wave and acquire a plurality of signals indicative of the propagating wave; and
   a processor configured to:
   (A) determine a slowness frequency coherence of the plurality of signals;
   (B) determine a histogram of a slowness distribution from the slowness frequency coherence wherein determining the histogram further comprises identifying peaks in a slowness-frequency coherence plot;
   (C) estimate an edge of the histogram by matching statistics of a fitting function to statistics of the histogram, wherein matching the statistics further comprises using at least one of: (i) a centroid, (ii) a peak location, (iii) a second moment about a centroid, (iv) a second moment about the peak, (v) a skewness about a centroid, and (vi) a skewness about a peak;

(D) use the estimated edge of the histogram to estimate the slowness of the propagating wave; and
(E) record the determined slowness on a suitable medium.

6. The apparatus of claim 5 wherein the propagating wave is selected from the group consisting of: (i) a compressional wave, (ii) a shear wave, and (iii) a Stoneley wave.

7. The apparatus of claim 5 wherein logging tool further comprises one of:
(i) a monopole transmitter, (ii) a dipole transmitter, and (iii) a quadrupole transmitter.

8. That apparatus of claim 5 wherein the processor is configured to use a fitting function of the form:

$$f(s)=A\, s^\beta e^{-\alpha s},\ s=S-S_0,\ S \geq S_0;$$

where S is the slowness, A. $\alpha$ and $\beta$ are fitting parameters.

9. The apparatus of claim 5 further comprising a conveyance device configured to convey the logging tool into the borehole, the conveyance device selected from: (i) a drilling tubular, and (ii) a wireline.

10. A computer-readable medium accessible to a processor, the computer-readable medium including instructions which are executed by the processor to:

determine a slowness-frequency coherence of a plurality of signals acquired by a logging tool conveyed in a borehole;

determine a histogram of a slowness distribution from the slowness-frequency coherence, wherein determining the histogram further comprises identifying peaks in a slowness-frequency coherence plot;

estimate an edge of the histogram by matching staticstics of a fitting function to statistics of the histogram wherein matching the statistics further comprises using at least one of: (i) a centroid, (ii) a peak location, (iii) a second moment about a centroid, (iv) a second moment about the peak, (v) a skewness about a centroid, and (vi) a skewness about a peak; and use the estimated edge of the histogram to determine the slowness of the propagating wave.

11. The machine readable medium of claim 10 further comprises at least one of (i) a ROM, (ii) an EPROM, (iii) an EAROM, (iv) a Flash Memory, and, (v) an Optical disk.

* * * * *

UNITED STATES PATENT AND TRADEMARK OFFICE
CERTIFICATE OF CORRECTION

| | | |
|---|---|---|
| PATENT NO. | : 7,672,784 B2 | Page 1 of 1 |
| APPLICATION NO. | : 11/820839 | |
| DATED | : March 2, 2010 | |
| INVENTOR(S) | : Yibing Zheng, Xiao Ming Tang and Douglas J. Patterson | |

It is certified that error appears in the above-identified patent and that said Letters Patent is hereby corrected as shown below:

Column 10, claim 4, line 42, delete "That method", insert --The method--;

Column 11, claim 7, line 8, delete "wherein logging", insert --wherein the logging--;

Column 11, claim 8, line 12, delete "That apparatus", insert --The apparatus--; and Column 12, line 8, delete "staticstics", insert --statistics--.

Signed and Sealed this

Twentieth Day of April, 2010

David J. Kappos
*Director of the United States Patent and Trademark Office*